(12) United States Patent
Parks et al.

(10) Patent No.: US 6,203,460 B1
(45) Date of Patent: Mar. 20, 2001

(54) PHASED CONTINUOUSLY VARIABLE TRANSMISSION CHAIN WITH ASYMMETRICAL GUIDE LINK AND MODIFIED STRUT LOCATION

(75) Inventors: Laurence Parks, Waverly; Mark D. Reese, Seneca Falls, both of NY (US)

(73) Assignee: BorgWarner Inc., Troy, MI (US)

( * ) Notice: Subject to any disclaimer, the term of this patent is extended or adjusted under 35 U.S.C. 154(b) by 0 days.

(21) Appl. No.: 09/298,776

(22) Filed: Apr. 23, 1999

Related U.S. Application Data
(60) Provisional application No. 60/104,273, filed on Oct. 14, 1998.

(51) Int. Cl.[7] ............................... F16G 5/18; F16H 7/00; F16H 13/06
(52) U.S. Cl. .......................... 474/85; 474/242; 474/206
(58) Field of Search ........................ 474/30, 84, 85–88, 474/89, 111, 156, 206, 213, 204, 228, 229, 900, 242, 245

(56) References Cited

U.S. PATENT DOCUMENTS

| | | |
|---|---|---|
| 4,507,106 | 3/1985 | Cole, Jr. .................. 474/215 |
| 4,767,388 * | 8/1988 | Tatara et al. ............. 474/245 |
| 5,007,883 | 4/1991 | Cole, Jr. et al. .......... 474/242 |
| 5,009,631 * | 4/1991 | Ivey et al. ............. 474/245 X |
| 5,334,111 * | 8/1994 | Cole, Jr. et al. ....... 474/245 X |
| 5,393,272 * | 2/1995 | Okuwaki et al. .......... 474/213 |
| 5,427,580 * | 6/1995 | Ledvina et al. ........... 474/213 |
| 5,439,423 * | 8/1995 | Okuwaki et al. .......... 474/245 |
| 5,453,058 | 9/1995 | Reese et al. .............. 474/206 |
| 5,645,502 | 7/1997 | Wakabayashi et al. ........ 474/85 |

FOREIGN PATENT DOCUMENTS

315890 * 11/1999 (JP) .

* cited by examiner

*Primary Examiner*—Thomas R. Hannon
*Assistant Examiner*—Marcus Charles
(74) *Attorney, Agent, or Firm*—Sidley & Austin; Greg Dziegielewski

(57) ABSTRACT

A chain for use with a continuously variable transmission is formed in two portions that are phased, or offset, by one-half pitch length. The chain portions include an asymmetrical guide link on the outside of alternate rows. The inner links have a substantially horizontal lower body and a horizontal upper portion of the passageway to position the strut in close proximity to the chain pitch line.

6 Claims, 4 Drawing Sheets

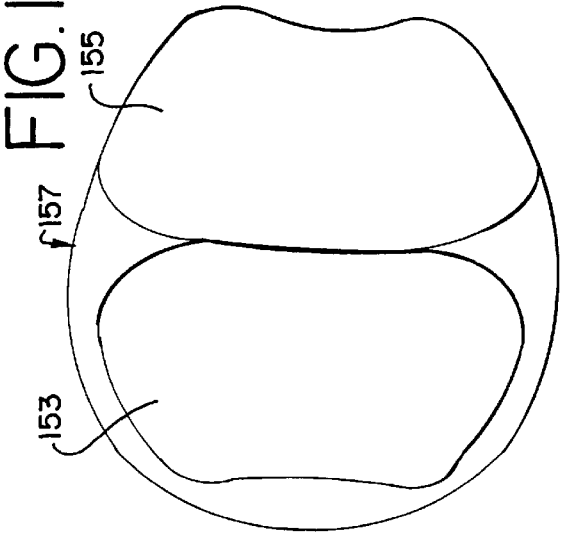
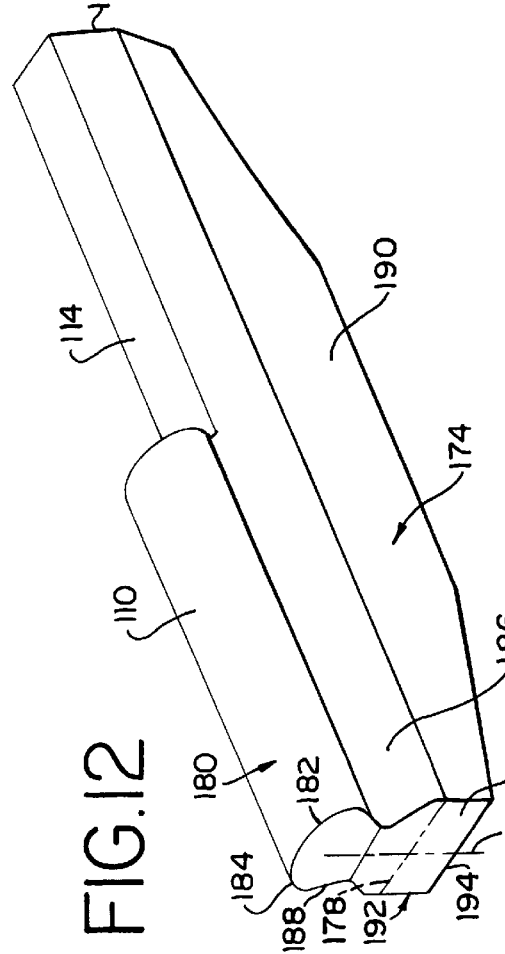
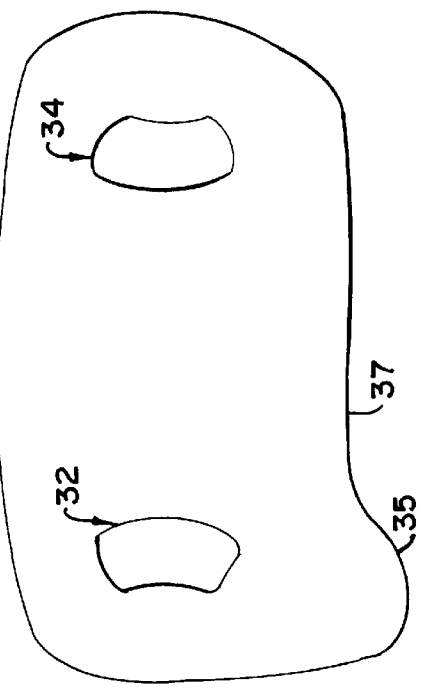
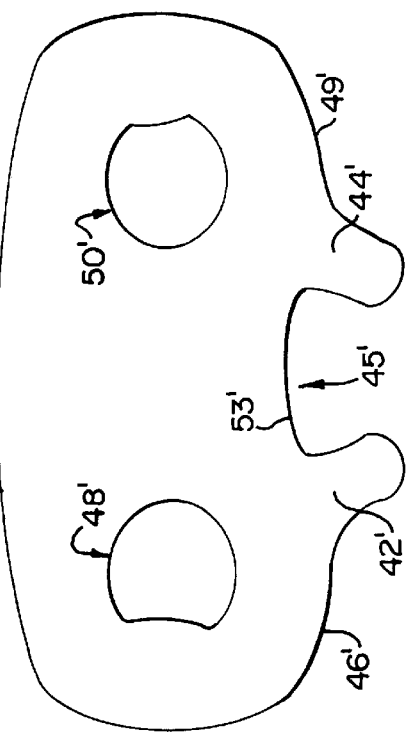

PHASED CONTINUOUSLY VARIABLE TRANSMISSION CHAIN WITH ASYMMETRICAL GUIDE LINK AND MODIFIED STRUT LOCATION

This application claims the benefit of provisional application U.S. Ser. No. 60/104,273, filed Oct. 14, 1998.

BACKGROUND OF THE INVENTION

This invention relates to a power transmission chain belt and, in particular, to a power transmission chain belt for use with a continuously variable transmission (CVT). More particularly, the present invention relates to a chain belt for a CVT with an asymmetrical guide link and a modified strut and link geometry that places the strut closer to the pitch line of the chain.

The belt of the present invention is comprised of a large number of interleaved link plates which are placed parallel to the chain width direction and carry a number of load blocks or struts for transmission of power to the variable width pulleys of the CVT. The belt is formed of a plurality of adjacent chain portions that are offset or phased by a portion of one chain pitch. Preferably, the belt is formed of at least two adjacent chain portions that are offset or phased by one-half pitch.

An example of a power transmission chain belt as used in a CVT is shown in FIG. 1 of the drawings. As shown in that figure, the CVT includes input shaft 101a and output shaft 102a, which carry primary (drive) and secondary (driven) pulleys 103a, 104a, respectively. The chain belt 105a interconnects the primary and secondary pulleys of the CVT.

Primary pulley 103a includes fixed pulley portion 103a', which is fixed to input shaft 101a, and moveable pulley 103b', which is moveable along input shaft 101a. Similarly, secondary pulley 104a includes fixed pulley 104a', which is fixed to the output shaft 102a and moveable pulley 104b', which is moveable along the output shaft. The effective diameters of pulleys 103a and 104a are changed by movement of the moveable pulley portions 103b', 104b', which is caused by operation of hydraulic actuators, as is known in the art. In this manner the speed change ratio between the input and output shafts can be varied continuously.

FIG. 2 generally illustrates a sectional view of a portion of a chain of the prior art for use in a variable pulley transmission of the type schematically illustrated in U.S. Pat. No. 5,007,883, which is incorporated herein by reference. The chain 10 comprises two chain assemblies or two chain portions 12, 14. The two portions 12, 14 are disposed in side-by-side relationship with the chain portions being offset from one another by one-half pitch. That is, the first chain 12 and second chain 14 are offset from each other by one-half pitch.

The two chain portions are interleaved and connected by pairs of pivot pins 16, 18 that extend through apertures in each of the links. One pin 16 is longer than the other pin 18 and extends through a guide link on the outside of the chain, as explained in more detail below.

The first portion of the chain includes a plurality of rows or sets 20, 22 of interleaved inner links 41. The inner links 41, shown more clearly in FIG. 8, are interlaced so that the apertures 48, 50 of one link set are transversely aligned with the apertures of the links of the next adjacent set. In this way, the rows of links articulate with respect to one another. The inner links include a pair of depending toes 42, 44 that extend downwardly from the link body. The toes define a passageway 45 for the retention of a strut 11, which is explained in more detail below.

The first portion of the chain of the prior art as shown in FIG. 2 includes retaining links 47 on alternate rows of the chain. The rows with retaining links include five links across each row. That is, three inner links with a retaining link on each outside. Retaining links are present in prior art chain assemblies to restrict excessive lateral motion of the strut. The retaining links are located on the ends of the link rows not containing guide links. The link passageway is shaped to restrict excessive lateral motion of the struts in the adjacent row. The rows without retaining links include four inner links across the width of the chain. Guide links 24, 36 are placed outside the retention links.

The inner links and retaining links include pairs of apertures that permit pairs of pins to extend through each aperture. The guide links include pairs of apertures that permit only a single pin to extend through each aperture. The single pin is fit securely in the aperture of the guide link and does not rotate with respect to the guide link. The pairs of pins in each aperture of the inner links rotate or rock with respect to one another, which permits the articulating motion of the inner links and rows of interleaved inner links. The use of rocker joints and pins in apertures of CVT chains as well as silent chains is well-known in the art. A pin and rocker joint is shown in U.S. Pat. No. 4,507,106, which is incorporated herein by reference. Pairs of pivot members extend across the length of the first portion of the chain and terminate slightly beyond the ends of the retaining members.

The second chain, or other chain portion, of the chain belt is also comprised of a plurality of interleaved inner links. The inner links are interlaced so that the apertures of one link set are transversely aligned with the apertures of the next adjacent set. In this way, the rows of links articulate with respect to one another.

The second portion of the chain also includes retaining links on alternate rows of the chain. The rows with retaining links include five links across each row. That is, three inner links with a retaining link on each outside. The rows without retaining links include four inner links across the width of the chain. The inner links in the second portion of the chain act in a similar manner to the inner links in the other portion of the chain. The links also include pivot members and rocker joints, in the same manner as the first portion of the chain.

Referring to FIG. 3, a long outboard load block or strut is held in the passageways formed between the depending toes of the links to engage the flanges of the pulleys. The strut 11 is symmetrical about a vertical centerline in the end direction and in the lengthwise (or transverse) direction. The strut includes a top 80, two rounded link contacting surfaces 82, 84, two grooves 86,88, a first side 90, a second side 92, and a bottom 94. The upper region of the strut, including the top and the rounded contacting surface, is similar in shape to the passageway and is only slightly smaller in size to allow the strut to be positioned in the passageway of the link.

In FIG. 4, a front view of the strut 11 shown in FIG. 3, the top of the strut includes an upper portion 80a and an extending portion 80b and ends 96, 98 that contact the flanges of the pulleys.

FIG. 5 illustrates a guide link 36 of the prior art. The link 36 has a pair of apertures 148, 150 for receiving the pins of an associated rocker joint pivot member. The apertures, and link configuration, is generally symmetrical about a vertical centerline. The link comprises a top 130, preferably substantially horizontal, and a bottom having two spaced depending toes 142, 144 that define a passageway 100 for the upper portion of a strut. The depending toes are shaped to hold the strut within the passageway 100.

FIG. 6 illustrates the aperture 150 in more detail. The aperture includes upper and lower curved portions 152, 154. The back portion 156 is preferably slightly curved to permit the pin to seat against the back portion. The front portion 158 is also curved at a radius that matches the radius of the rocker pin. A rocker pin is fit securely into the aperture 150.

FIG. 7 illustrates the passageway 100a of the link in more detail. In FIG. 7, the passageway has rounded inner portions 102, 104 and a rounded upper portion 105. The rounded inner portions form two toes 106, 108 at the bottom of the link. The upper portion of the strut is shaped to match the upper portion 105 and inner portions 102, 104 of the link.

FIG. 8 illustrates inner link 41 having a substantially flat or horizontal top portion 43. The top portion 53 of the passageway 45 is curved to match the strut. Sides 46, 49 angle from the top 43 to join the toes 42, 44.

The aperture 159 of an inside link is shown in detail in FIG. 9. The aperture includes a slightly rounded back portion 162 and a fully rounded front portion 164. Additionally, top portion 166 and bottom portion 168 are rounded. A pair of rocker pins are typically utilized that have curved front portions that engage each other with rocking contact.

An alternative link passageway of the prior art is shown in FIG. 10. The passageway 200 includes inside rounded portions 202, 204, that form toes 206, 208. The upper portion 210 of the passageway is formed into another rounded portion to provide greater retention of the complementary strut in the passageway.

Examples of phased transmission chains for CVTs are shown in U.S. Pat. Nos. 5,645,502 and 5,453,058, which are incorporated herein by reference. When these transmission chains are used, noise is generated as the load blocks or struts contact the sides of the pulleys. Efforts have been directed to decreasing the noise generated during such contact while maintaining a durable chain. Efforts at decreasing noise generation and minimizing the number and complexity of chain components involved, for example, using links of more than one pitch length, alternating the lengths of the struts, and changing the length of the windows of the links that receive the struts.

Other efforts at noise reduction in the prior art have included the use of two chain portions positioned in side-by-side relationship, but offset or phased by one-half pitch length. Other phased chains of the prior art have utilized three chain portions positioned in side-by-side relationship, but with the center portion offset from the two outside chain portions by a distance of one-half pitch length. The chain of the present invention is directed to phased chain with two chain portions.

SUMMARY OF THE INVENTION

The present invention is directed to a chain for use in a continuously variable pulley transmission (CVT). In particular, the present invention relates to a chain belt for a CVT with an asymmetrical guide link and a modified strut and link geometry that places the top of the strut closer to the pitch line of the chain.

In one embodiment, the chain includes two chain portions or chains positioned in side-by-side relationship with one another. One portion of the chain is offset from the other portion by a distance of one-half pitch length. The two chain portions, when positioned in side-by-side relationship, define the overall lateral or transverse width of the chain. Each chain portion includes inner links having a pair of spaced apart toes to define a passageway to receive a strut.

A variety of struts of different lengths are used in the chain of the present invention. Each strut has a length that transverses almost the entire width of the chain. However, struts differ in length and in the location of the upper support portions for being received and held within the toes of the links.

One version of the struts, which are used in two different lengths, provides an upwardly extending, rounded portion that extends through the toes of one of the chains or chain portions. Extending laterally from the upwardly extending portion is a flat or recessed portion. This flat portion support the bodies of the links of the other portion of the chain. This version of the strut can be used for both portions of the chain by reversing the orientation of the strut so that the upwardly extending portion can be located in the toes of one or the other portion of the chain.

The two struts oriented in opposite directions, are alternated along the length of the chain. Each version of the strut is also alternated with a longer or shorter version of that strut. The longer or shorter versions correspond to whether the particular strut is holding the body of an outside guide link.

When each portion of the chain and the associated struts are in side-by-side relation and interlaced, the struts are supported by one of the chain portions, depending on where the upwardly extending portion of the strut is located and held by the toes of the links. In this way, a phased chain suitable for a CVT is assembled in a way that provides support for the struts across the entire transverse width of the chain.

The chain portions each include inner links and guide links. The inner links have apertures formed to permit both pins to extend therethrough. One pin seats against the back portion of the aperture while the other pins rotates with respect to the aperture to provide the rocking contact of the pivot joint.

Guide links are formed and placed on the ends of each portion of the chain. The present invention includes a novel guide link structure that is asymmetric with respect to a vertical centerline between the two apertures. The guide link includes an upper edge, a lower edge and two side edges. The upper edge is substantially horizontal, as in the conventional links of the prior art. Each side edge is substantially vertical. The lower edge is formed in two portions, which creates the asymmetric shape. One lower edge portion is substantially horizontal for almost the entire length of the bottom edge. The flat lower edge portion terminates in a rounded outwardly extending portion. The outwardly extending portion has one side that terminates in the vertical side edge of the guide link.

The purpose of the inner guide link is to restrict excessive lateral motion of the struts with the chain assembly without the use of retention links. The asymmetrical guide link, due to its novel shape, allows for the elimination of the inside retention links. The asymmetrical guide link contains a recess on the side opposite the outwardly extending portion to accept the outwardly extending portion of the adjacent guide link during articulation. The guide links are oriented such that the outwardly extending portion of each guide link nests within the recess of each adjacent guide link. In the preferred embodiment, the outwardly extending portion of all guide links on one side of the chain are oriented in the same direction as the guide links on the other side of the chain.

The inner links of the present invention also provide a novel structure that permits location of the top of the strut closer to the pitch line of the chain. The pitch line typically extends in a horizontal direction between the contact points of the rocker pins in each aperture. The inner link of the present invention includes a substantially flat or horizontal upper portion in the passageway that holds the strut. Similarly, the outer edge portions of the bottom edge of the link, which are on opposite sides of the passageway, also are substantially flat or horizontal. Thus, the body of the link is reduced in size in the vertical direction and the passageway can be located closer to, or in near proximity of, the pitch line of the chain. The specific distance from the pitch line of the chain to the bottom of the strut in the present invention is 8.40 mm. In the prior art, this dimension was 8.29 mm. The strut location is closer to the chain pitch line, however the overall strut height was increased in the present invention. This provides for increased strut strength due to the taller cross section of the strut.

In one embodiment of the invention, a chain for use in a variable pulley transmission comprises a first chain portion, and a second chain portion in a side-by-side relationship and offset with respect to each other. The first chain portion is offset from the second chain portion by one-half pitch length.

Each chain portion comprises a plurality of interlaced rows of inner links. Although the specific lacing pattern can vary, the preferred lacing pattern consists of 5 links interlaced with the 4 links and 2 guides of the adjacent row. Each of the inner links have a pair of apertures that are transversely aligned and connected by a pair of pivot members or pins. Preferably the pins are pairs of rocker pins that rock or act against one another and permit rotation of the rows of inner links with respect to one another. Each inner link also has a pair of spaced apart, depending or downwardly extending toes or teeth. The toes define a continuous inner surface comprising two inner flanks and a crotch. The toes define a passageway to receive at least a portion of the strut. The toes hold an upwardly extending portion of the strut that passes between the toes.

At the outer ends of alternate rows of link are guide links. Each of the guide links also have a pair of apertures. However, in contrast to the inner links, the guide links have apertures that support only one of the pair of pivot pins that extend across the chain portion. By having the pin fitted securely in the guide link, the row of links is held in the chain portion. The secure fit of the pin in the guide link may be accomplished by press fitting or the like.

BRIEF DESCRIPTION OF THE DRAWINGS

FIG. 12 is a perspective view of the strut of the present invention.

FIG. 13 is a schematic side view illustrating the location of the pair of rocker pins in an aperture.

FIG. 14 is a side view of the asymmetrical guide link of the present invention.

FIG. 15 is a side view of the inner link of the present invention.

DETAILED DESCRIPTION OF THE PREFERRED EMBODIMENTS

Figure 2:
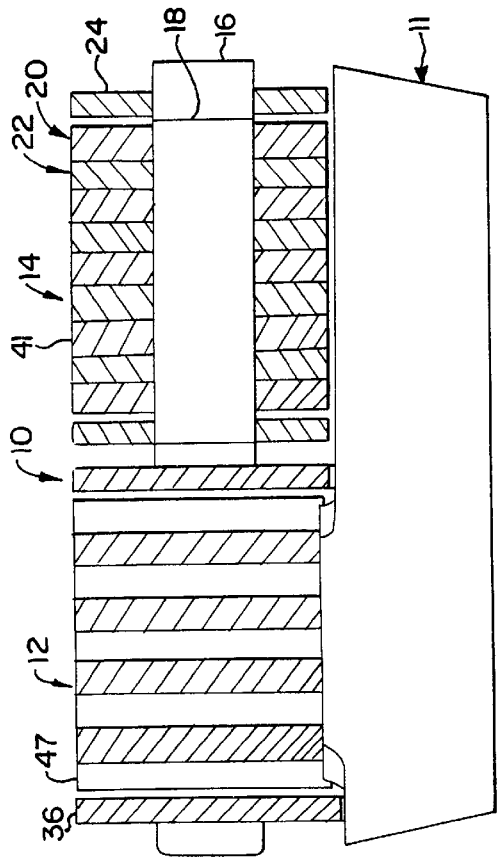
FIG. 2 is a sectional view of a conventional CVT chain belt of the prior art showing the transverse location of the links and the two phased chain portions.
Figure 4:
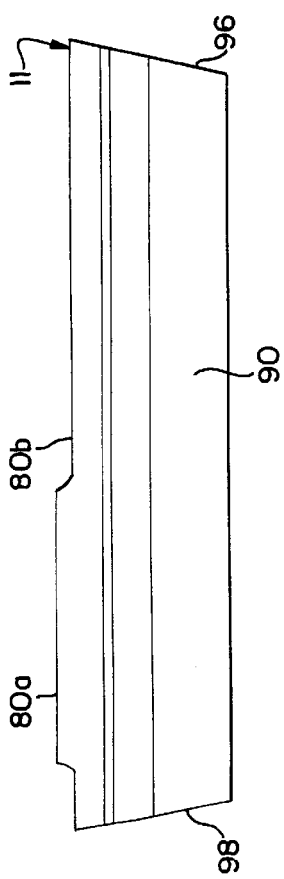
FIG. 4 is a front view of a strut of the prior art.
Figure 3:
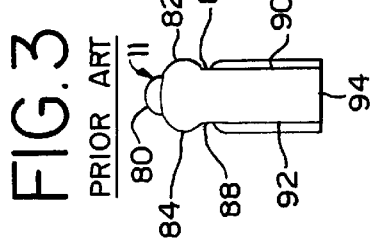
FIG. 3 is a side view of a strut of the prior art.
Figure 1:
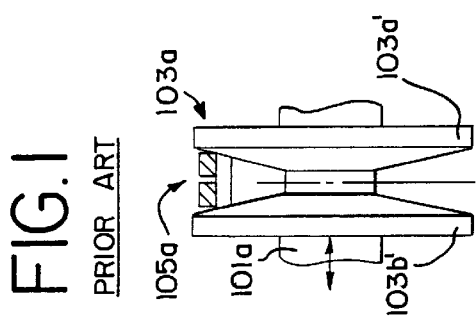
FIG. 1 is a schematic view of a pair of variable pulleys of a CVT of the prior art together with a conventional CVT chain of the prior art.
Figure 5:
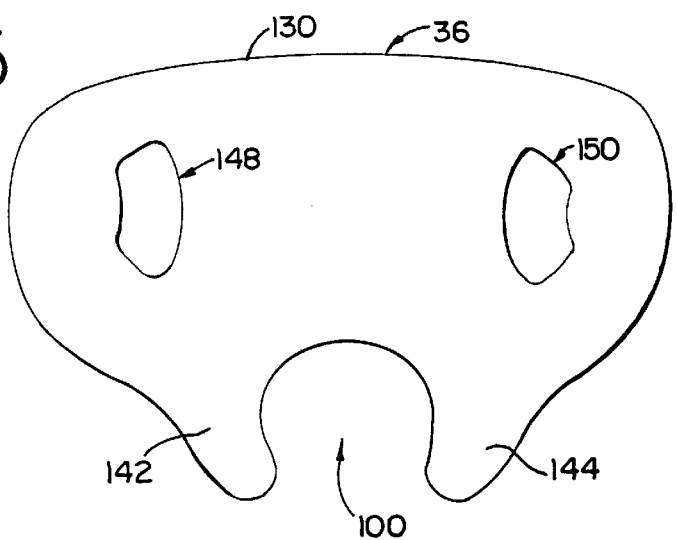
FIG. 5 is a side view of a guide link of the prior art with a pair of toes.
Figure 6:
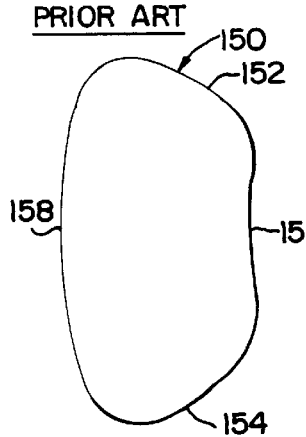
FIG. 6 is an enlarged view of the aperture of the link of FIG. 5.
Figure 7:
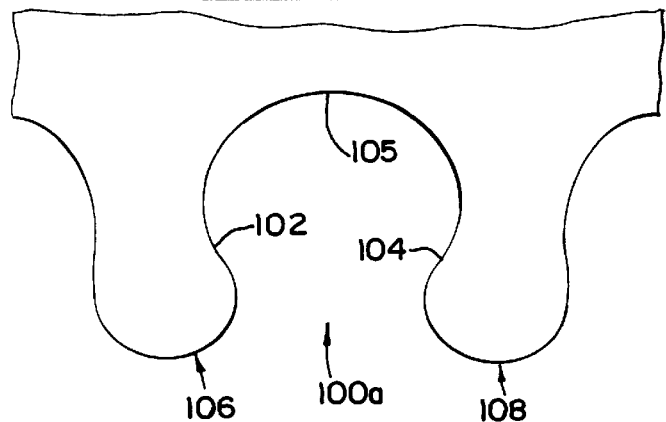
FIG. 7 is an enlarged view of the passageway of the link of FIG. 5.
Figure 8:
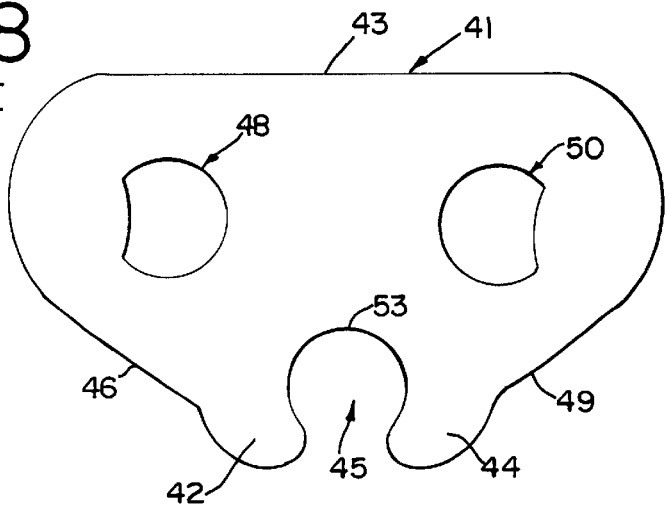
FIG. 8 is a side view of an inner link of the prior art.
Figure 9:
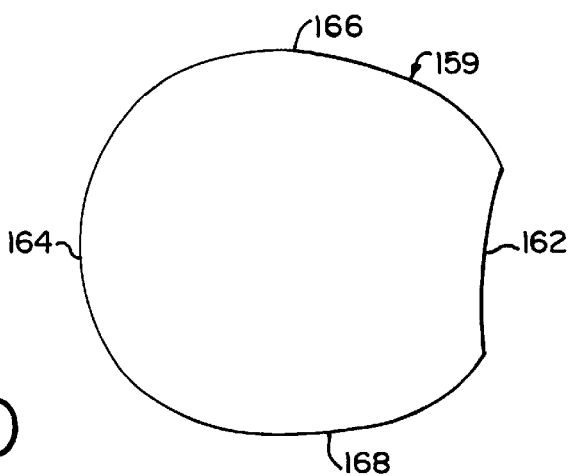
FIG. 9 is an enlarged view of the aperture of the link of FIG. 8.
Figure 10:
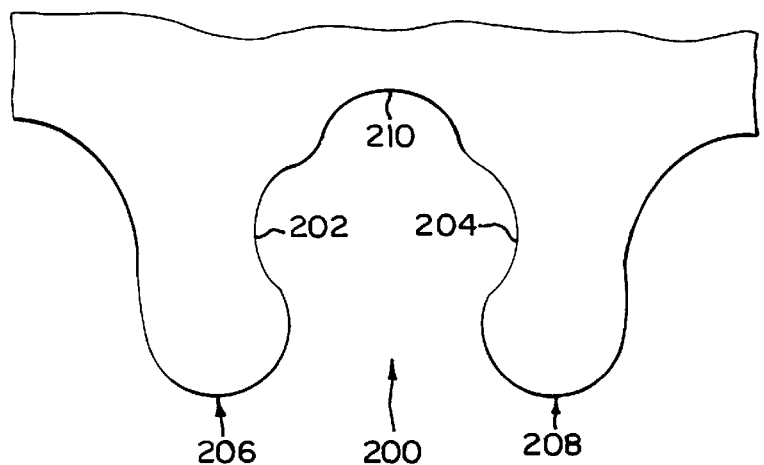
FIG. 10 is an enlarged view of another embodiment of the passageway of an inner link.
Figure 11:
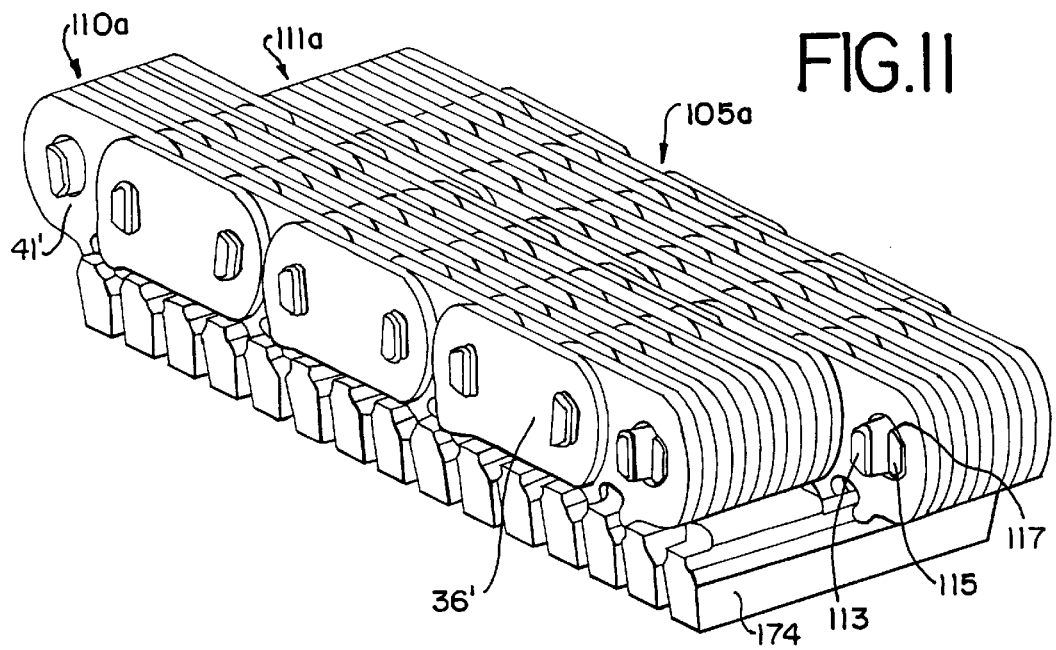
FIG. 11 is a perspective view of the CVT chain of the present invention.

Turning now to the drawings, FIG. 11 generally illustrates a perspective view of a portion of a chain of the present invention for use in a variable pulley transmission. The chain 105*a* of this invention comprises two chain assemblies or two chain portions 110*a*, 111*a*. The two portions 110*a*, 111*a* are disposed in side-by-side relationship with the chain portions being offset from one another by one-half pitch. That is, the first chain 110*a* and second chain 111*a* are offset from each other by one-half pitch. Of course, other embodiments and configurations are possible within the scope of the present invention.

When assembled, the chain has a transverse width substantially the same as the combined or overall width of the first and second portions of the chain. Each portion of the chain may have any suitable transverse width. However, the widths must be selected in order to provide the phasing of the two sections and maintain the lacing of the chain.

The two chain portions 110*a*, 111*a* are interleaved and connected by pairs of pivot pins 113, 115 that extend through aperture 117 in each of the links. One pin is longer than the other pin and extends through a guide link 36' on the outside of the chain.

The first portion 110*a* of the chain includes a plurality of rows or sets of interleaved inner links 41'. The inner links 41', shown more clearly in FIG. 15 and discussed in more detail below, are interlaced so that the apertures of one link set are transversely aligned with the apertures of the links of the next adjacent set. In this way, the rows of links articulate with respect to one another. In one preferred embodiment, the lacing pattern consists of 5 links interlaced with 4 inner links and 2 guide links of the adjacent row.

FIG. 12 illustrates the strut 174 for use with the chain assembly of the present invention. This strut may be used on both sides of the two-way phased chain by alternating its orientation along the chain. Longer and shorter versions of this strut may be alternated along the length of the two-way phased chain in order to provide more favorable noise characteristics of the chain in operation in a variable pulley transmission.

The strut 174 is symmetrical about a vertical centerline in the end direction 176 and in the lengthwise (or transverse) direction 178. The strut 174 includes a top 180, two rounded link contacting surfaces 182, 184, two grooves 186, 188, a first side 190, a second side 192, a bottom 194 and ends 196, 198 that contact the flanges of the pulley surfaces. The upper region of the strut, including the top and the rounded contacting surface, is similar in shape to the passageway 45' (shown in FIG. 15 and discussed in detail below) and is only slightly smaller in size to allow the strut to be positioned in the passageway.

A groove 186, 188 is provided between the rounded contacting surfaces and each substantially vertical side 190, 192. The groove is shaped to complement the projections on toes 42', 44'. When the strut is received in the passageway 45', relative vertical movement of the strut from the links is prevented as a result of the complementary engagement of the strut in the passageway.

In FIG. 13, an aperture of an inside link is shown. The aperture 157 is rounded to receive the rocker pins 153, 155 therein. One pin 155 is seated against the back portion of the aperture 157 to prevent movement with respect to the aperture. The other rocker pin 153 is free to rotate with respect to aperture 157, but is restricted in rotation with respect to adjacent links. Such rocker joints, which are utilized in the present invention, are well known in the art.

The novel asymmetrical guide link 36' is shown in more detail in FIG. 14. The guide link includes a pair of apertures 32, 34 that are shaped to provide a secure fit for the pins. The lower portion 37 of the guide link is substantially horizontal. The lower portion 37 terminates in an outwardly extending portion 35. The asymmetrical guide link 36' can be placed in the chain in either orientation so that the outwardly extending portion can be located on either side of the link.

The present invention provides a modified passageway geometry in contrast to the passageway geometries of the prior art, some of which are illustrated and discussed in this application. The passageway 45' in the inner link 41' shown in FIG. 15 is located at a point in the link that is closer to the apertures, which locates the passageway closer to the chain pitch line. Specifically, link bottom portions 46', 49' are made substantially horizontal and the upper portion 53' of the passageway is also made substantially horizontal. In this manner, the link can be made with less lower extension and the top of the strut is located closer to the chain pitch line.

Those skilled in the art to which the invention pertains may make other modifications and embodiments employing the principles of this invention without departing from its spirit or essential characteristics, particularly upon considering the foregoing teachings. The described embodiments are to be considered in all respects as only illustrative and not restrictive.

What is claimed is:

1. A power transmission chain, comprising:

a first chain portion having a plurality of interlaced rows of links with each row having a plurality of transversely arranged links, pivot members joining said interlaced rows of links to form a chain assembly, said rows of links including inner links, said inner links each having a pair of apertures for receiving said pivot members and a pair of toes extending downward from each link to define a passageway, alternate rows of said links include asymmetrical guide links on the outer ends of said rows of links, said guide links having a pair of apertures for receiving said pivot members, said pivot members being fit securely within said apertures of said guide links, said guide links having a lower edge portion at a first end and an outwardly extending portion at a second end, said lower edge portion and said outwardly extending portion being asymmetrical about a vertical centerline between the apertures of said links, a plurality of struts, said struts having top portions positioned in said passageway of said toes of said links of said first chain portion;

a second chain portion having a plurality of interlaced rows of links with each row having a plurality of transversely arranged links, pivot members joining said interlaced rows of links to form a chain assembly, said rows of links including inner links, said inner links each having a pair of apertures for receiving said pivot members and a pair of toes extending downward from each link to define a passageway, alternate rows of said links include asymmetrical guide links on the outer ends of said rows of links, said guide links having a pair of apertures for receiving said pivot members, said pivot members being fit securely within said apertures of said guide links, said guide links having a lower edge portion at a first end and an outwardly extending portion at a second end, said lower edge portion and said outwardly extending portion being asymmetrical about a vertical centerline between the apertures of said links, a plurality of struts, said struts having top portions positioned in said passageway of said toes of said links of said second chain portion; and said first chain portion and said second chain portion being placed in side-by-side relation and offset by one-half pitch length of said chain, said struts positioned within said first portion being interleaved with said struts positioned within said second portion.

2. The chain of claim 1 wherein said outwardly extending portion of said guide link is slightly rounded and has one side blended with a vertical side of said link.

3. The chain of claim 1 wherein said outwardly extending portion of said guide link is substantially horizontal for a substantial portion of a bottom edge of said guide link, said bottom edge including both said outwardly extending portion and said lower edge portion of said guide link.

4. The chain of claim 1 wherein said inner link includes a passageway having a substantially horizontal upper portion.

5. The chain of claim 4 wherein said inner link includes a pair of lower edge portions adjacent said toes and on opposite sides of said passageway, said lower edge portions being substantially horizontal.

6. The chain of claim 5 wherein said horizontal passageway upper portion is located in near proximity to the horizontal centerline between said apertures.

* * * * *